April 5, 1927.
E. HUTCHENS
HORIZONTAL BEAD FLIPPER
Filed April 2, 1924　　2 Sheets-Sheet 1
1,623,730
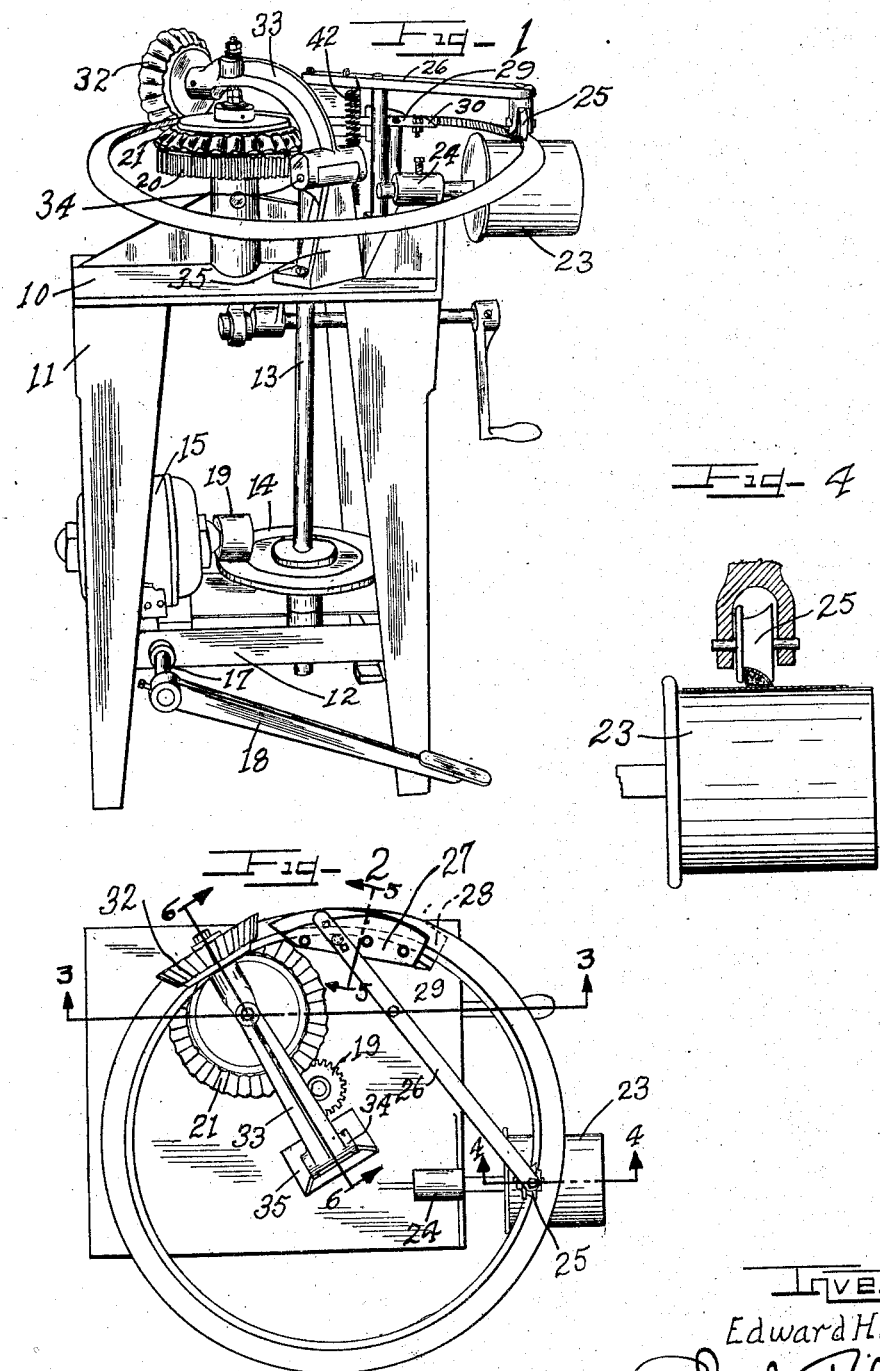
Inventor
Edward Hutchens
by Charles W. Hills
Attys.

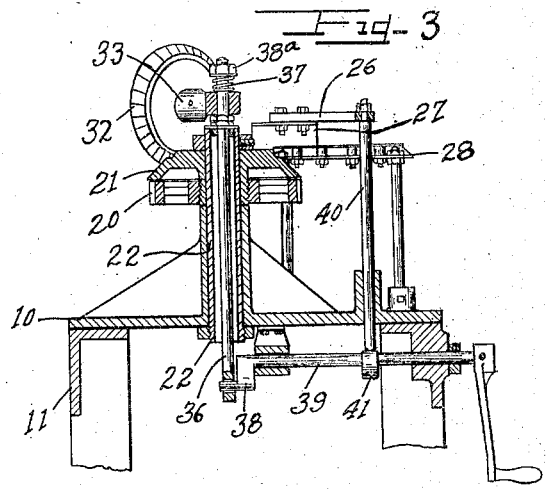
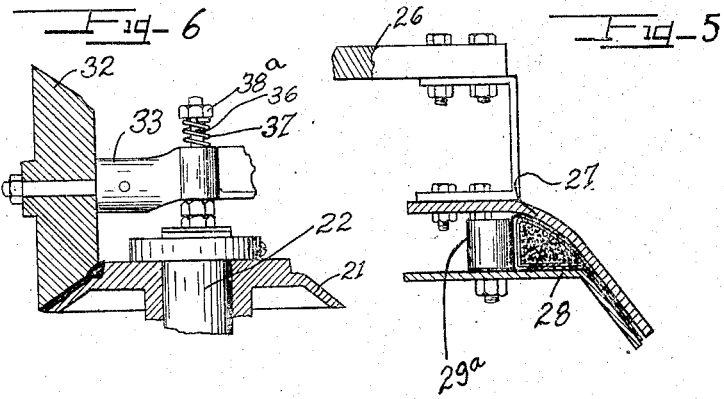
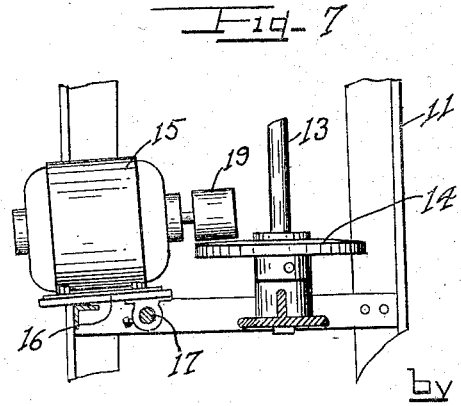

Patented Apr. 5, 1927.

1,623,730

UNITED STATES PATENT OFFICE.

EDWARD HUTCHENS, OF MILWAUKEE, WISCONSIN, ASSIGNOR TO UTILITY MANUFACTURING CO., OF CUDAHY, WISCONSIN, A CORPORATION OF WISCONSIN.

HORIZONTAL BEAD FLIPPER.

Application filed April 2, 1924. Serial No. 703,617.

This invention relates to a horizontal type of machine for wrapping gummed fabric about a bead such as used in constructing pneumatic tires.

It is an object of this invention to provide a machine of the class identified capable of rapid operation without handling the fabric on its coated side.

It is also an object of this invention to provide a special form of folder that will automatically bend the fabric about the sides of the bead.

It is a further object of this invention to provide a machine wherein half of the operating parts are arranged as a work supporting surface, the remaining parts being adapted to be simultaneously brought against and lifted from the working surface.

It is another object of this invention to provide a motor drive with a sensitive control by the operator.

Other and further objects of this invention will be apparent from the disclosures in the accompanying drawings and specification.

This invention (in a preferred form) is illustrated in the drawings and hereinafter more fully described.

On the drawings:

Figure 1 is a perspective view of a machine embodying the features of this invention, with a completed bead and its flipper strip in place on the machine.

Figure 2 is a top plan view thereof.

Figure 3 is a section on the line 3—3 of Figure 2.

Figure 4 is a section on the line 4—4 of Figure 2.

Figure 5 is an enlarged section on the line 5—5 of Figure 2.

Figure 6 is an enlarged section on the line 6—6 of Figure 2.

Figure 7 is a fragmentary detail of the friction driving mechanism.

As shown on the drawings:

This machine was designed to wrap a strip of rubberized fabric around the bead ring or core for an automobile tire, in such a way as to leave flipper strips projecting at the desired angle to be built directly into a tire carcass.

The machine proper comprises a table 10 with suitable legs 11 and a low shelf 12 supporting a vertical shaft 13 carrying a friction disc 14. An electric motor 15 is mounted on a balance plate 16 carried by a shaft 17 to which a foot lever 18 is secured. The motor is provided with a friction pulley 19 to engage the disc 14 when the foot lever is depressed to rotate the shaft and motor support. The motor is so arranged that its weight overbalances the foot lever and normally tends to tilt the motor pulley out of contact with the disc so that a very sensitive control is provided for the operator, which is necessary because of the very tacky nature of the rubberized fabric and bead handled by the machine.

The upper end of the vertical shaft 13 projects above the top of the table and carries a gear 19 which meshes with a larger gear 20 secured to a fluted bevel wheel 21 rotating about a tube 22 projecting down through the table top for a purpose to be brought out hereinafter. For the sake of orderliness in the presentation of the subject, the various features of the machine will be taken up in the order they affect the work.

A flanged roller 23 is adjustably mounted in a bracket 24. This roller feeds the gummed fabric under the bead, and the flange on the roller determines the overlap between the two edges of the fabric after it has been wrapped around the bead. A small roller 25 above the flanged roller conforms to the shape of the bead and presses the bead into firm contact with the fabric passing over the flanged roller 23. The roller 25 is mounted on one end of a bar 26, the other end of which carries a folding plate 27. From the rollers 24 and 25, the bead, pulling the fabric which has been tacked thereto on the underside by the previous operation, enters a hemmer or folder comprising a supporting plate 28 below the fabric, a bracket 29 secured thereto having a series of rollers 29ª and an initial rake 30 to lift the fabric inside the bead into contact with the vertical inner edge thereof and finally the folding plate 27 which bends over the upstanding edge of fabric into contact with the top of the bead into a shape such as shown in Figure 5.

From the folder, the bead and encompassing flipper strip pass to the power driven fluted bevel wheel 21. Because of the greater circumference of the edges of the flipper strips as compared to the bead diameter, the edges must be stretched to cause them to be flat in a position to be built into a tire carcass. An idler fluted wheel 32 meshes with the fluted wheel 21 to perform this stretching operation. The two fluted wheels intermesh like gears to stretch the fabric over the convolutions, or if desired separate gears may also be provided to further insure intermeshing of the fluted portions of the wheels. A groove is also provided in both wheels to provide for the bead. The wheel 21 being power driven serves to pull the bead and fabric through the preliminary operations.

The wheel 32 is mounted on the end of an arm 33 pivoted at 34 to a table bracket 35. A rod 36 passes up through the tube 22 and through an aperture in the arm 33, a nut on the rod below the arm forming a shoulder. Above the arm a spring 37 and nut 38ª serve to give an elastic load on the arm when the rod is drawn downwardly by an eccentric 38 on crank operated shaft 39 below the table. When the rod is pushed up, it lifts the arm 33 and the fluted wheel 32 to allow removal of the completed bead. The bar 26 also has a downwardly projecting rod 40 actuated by a cam 41 on the shaft 39 which serves to lift the roller 25 and folder off the bead simultaneously with a similar movement of the fluted wheel 32. A spring 42 serves to give a proper working pressure on the bar 26.

I am aware that many changes may be made and numerous details of construction may be varied through a wide range without departing from the principles of this invention, and I therefore do not purpose limiting the patent granted otherwise than necessitated by the prior art.

I claim as my invention:

1. A bead flipping machine comprising a pair of rollers adapted to cause initial contact between the bead and fabric on one side of the bead, means for folding the fabric into contact with the other sides of said beads and a pair of fluted wheels adapted to stretch the outstanding edges of the fabric into a smooth surface.

2. In a bead flipping machine, a pair of fluted bevel wheels adapted to stretch the edges of the fabric into a smooth flange, and means for driving one of said wheels.

3. In a bead flipping machine, a longitudinally adjustable flanged roll for feeding the fabric beneath the bead, a folder comprising a supporting plate, a bracket secured thereto adapted to lift the flat fabric into a vertical position in contact with the side of the bead, and a folding plate adapted to bend over the vertical fabric into contact with the remaining side of the bead and with the other or flat edge of the fabric.

4. In a machine of the class described, a pair of fluted bevel wheels adapted to stretch and pull the material through the machine, and a folder for folding the material about a bead.

In testimony whereof I have hereunto subscribed my name.

EDWARD HUTCHENS.